United States Patent
Chu et al.

(10) Patent No.: US 9,818,226 B2
(45) Date of Patent: Nov. 14, 2017

(54) METHOD FOR OPTIMIZING OCCLUSION IN AUGMENTED REALITY BASED ON DEPTH CAMERA

(71) Applicant: NATIONAL TSING HUA UNIVERSITY, Hsinchu (TW)

(72) Inventors: Chih-Hsing Chu, Hsinchu (TW); Po-Yuan Huang, Nantou County (TW)

(73) Assignee: National Tsing Hua University, Hsinchu (TW)

(*) Notice: Subject to any disclaimer, the term of this patent is extended or adjusted under 35 U.S.C. 154(b) by 155 days.

(21) Appl. No.: 14/957,373

(22) Filed: Dec. 2, 2015

(65) Prior Publication Data

US 2016/0210787 A1    Jul. 21, 2016

(30) Foreign Application Priority Data

Jan. 21, 2015 (TW) .............................. 104101890 A

(51) Int. Cl.
    *G06T 19/00* (2011.01)
(52) U.S. Cl.
    CPC ................................. *G06T 19/006* (2013.01)
(58) Field of Classification Search
    CPC .................................................. G06T 19/006
    See application file for complete search history.

(56) References Cited

U.S. PATENT DOCUMENTS

| | | | |
|---|---|---|---|
| 8,405,680 B1 * | 3/2013 | Cardoso Lopes | G06T 19/00 345/426 |
| 2010/0271466 A1 | 10/2010 | Newton | |
| 2013/0101164 A1 * | 4/2013 | Leclerc | G06T 11/00 382/103 |
| 2014/0146134 A1 | 5/2014 | Tu et al. | |
| 2014/0192164 A1 | 7/2014 | Tenn et al. | |
| 2015/0206335 A1 * | 7/2015 | Hugel | A63F 13/10 345/419 |

FOREIGN PATENT DOCUMENTS

| | | |
|---|---|---|
| CN | 101911124 B | 10/2013 |
| CN | 1038413956 A | 6/2014 |
| TW | 200828182 A | 7/2008 |
| TW | 201429242 A | 7/2014 |

\* cited by examiner

*Primary Examiner* — Edward Park
(74) *Attorney, Agent, or Firm* — Muncy, Geissler, Olds & Lowe, P.C.

(57) ABSTRACT

A method for optimizing occlusion occurring in an augmented reality system comprising a depth camera and a two-dimensional camera comprises the steps of: capturing, by a depth camera, a scene and an object in the scene to obtain initial depth data, and capturing, by the two-dimensional camera, the scene and the object to obtain two-dimensional image data; in-painting the initial depth data to obtain in-painted depth data; performing a depth buffer calculation according to the in-painted depth data and a virtual model to obtain an occlusion relationship between the object and the virtual model, and generating an occluded partial image according to the two-dimensional image data and the virtual model; estimating partially approximated polygon according to the occluded partial image; and generating an occluded result according to the partially approximated polygon, the two-dimensional image data and the virtual model.

9 Claims, 7 Drawing Sheets

METHOD FOR OPTIMIZING OCCLUSION IN AUGMENTED REALITY BASED ON DEPTH CAMERA

This application claims priority of No. 104101890 filed in Taiwan R.O.C. on Jan. 21, 2015 under 35 USC 119, the entire content of which is hereby incorporated by reference.

BACKGROUND OF THE INVENTION

Field of the Invention

The invention relates to a method for optimizing occlusion, and more particularly to a method for optimizing occlusion in augmented reality based on depth cameras.

Related Art

Recently, depth sensing technologies have been successfully applied to various industries. For example, the entertainment industry has developed novel man-machine interaction functions based on human body tracking and motion recognition enabled by depth cameras. A common principle of depth sensing is to emit infrared light to the target scene and thus to generate laser speckle patterns on the objects in the scene. Then, the laser speckle data is obtained through a sensing lens and the depth values are calculated. When the infrared light is projected onto an object in the scene, errors may be generated in the laser speckles due to various reasons such as occlusion or poor reflective properties on the object surface. The depth value of the object will be incorrectly estimated. This problem is likely to occur around the object edges. In addition, random noises of the laser speckles sometimes cause inconsistency or information loss of the depth data. As a result, the depth image taken by depth cameras becomes unstable and jittering.

The augmented reality (AR) technology combines virtual objects with the real world, and thus provides interactions between them to enhance user experience. The depth information of the real scene captured by depth cameras helps position virtual objects in augmented reality environment. Quality visualization of the content mixed with real and virtual objects requires proper processing of their mutual occlusion. In order to display virtual objects correctly, a common method is to directly perform a depth buffer (Z-buffer) calculation according to the depth data and the current viewing angle of the camera. The occluded portion of the virtual objects will not be displayed. However, the effectiveness of this method highly depends on the data quality provided by the depth cameras. The Z-buffer method tends to produce incorrect occlusion result with depth data of poor quality. For instance, some depth data pixels are lost, failing to occlude the virtual object properly. The object edges or silhouettes occluded often become rugged. Moreover, the data inconsistency between frames causes jittering of the occluded edges or silhouettes. These problems significantly deteriorate the visualization quality in augmented reality applications.

SUMMARY OF THE INVENTION

This invention aims to provide a method for optimizing occlusion processing in augmented reality using the depth data captured by depth cameras. The focus is to improve the visualization result influenced by missing depth data pixels, the uneven occluded edges/silhouettes and jittering of the occluded edges/silhouettes.

To achieve those objectives, the invention provides a method for optimizing occlusion processing in an augmented reality application containing one or multiple depth cameras and one or multiple color cameras. The method comprises the steps of: capturing, by the one or multiple depth cameras, a scene and an object in the scene to obtain initial depth data, and capturing, by the one or multiple conventional cameras, the scene and the object to obtain color image data; in-painting the initial depth data to obtain in-painted depth data; performing a depth buffer calculation according to the in-painted depth data and a virtual model to determine the occlusion relationship between the object and the virtual model, and generating an occluded partial image according to the color image data and the virtual model; estimating a partially approximated polygon according to the occluded partial image; and generating an occluded result according to the partially approximated polygon, the color image data and the virtual model.

The invention optimizes the occlusion between virtual models and the real scene in an augmented reality application with depth cameras. The method provides solutions for filling missing depth data pixels, smoothing uneven occluded edges/silhouettes, and reducing variations in continuous frames, and providing adjustable parameters in response to different conditions.

Further scope of the applicability of the present invention will become apparent from the detailed description given hereinafter. However, it is noted that the detailed description and specific examples, while indicating preferred embodiments of the present invention, are given by the way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings, wherein the same references relate to the same elements.

Figure 1:
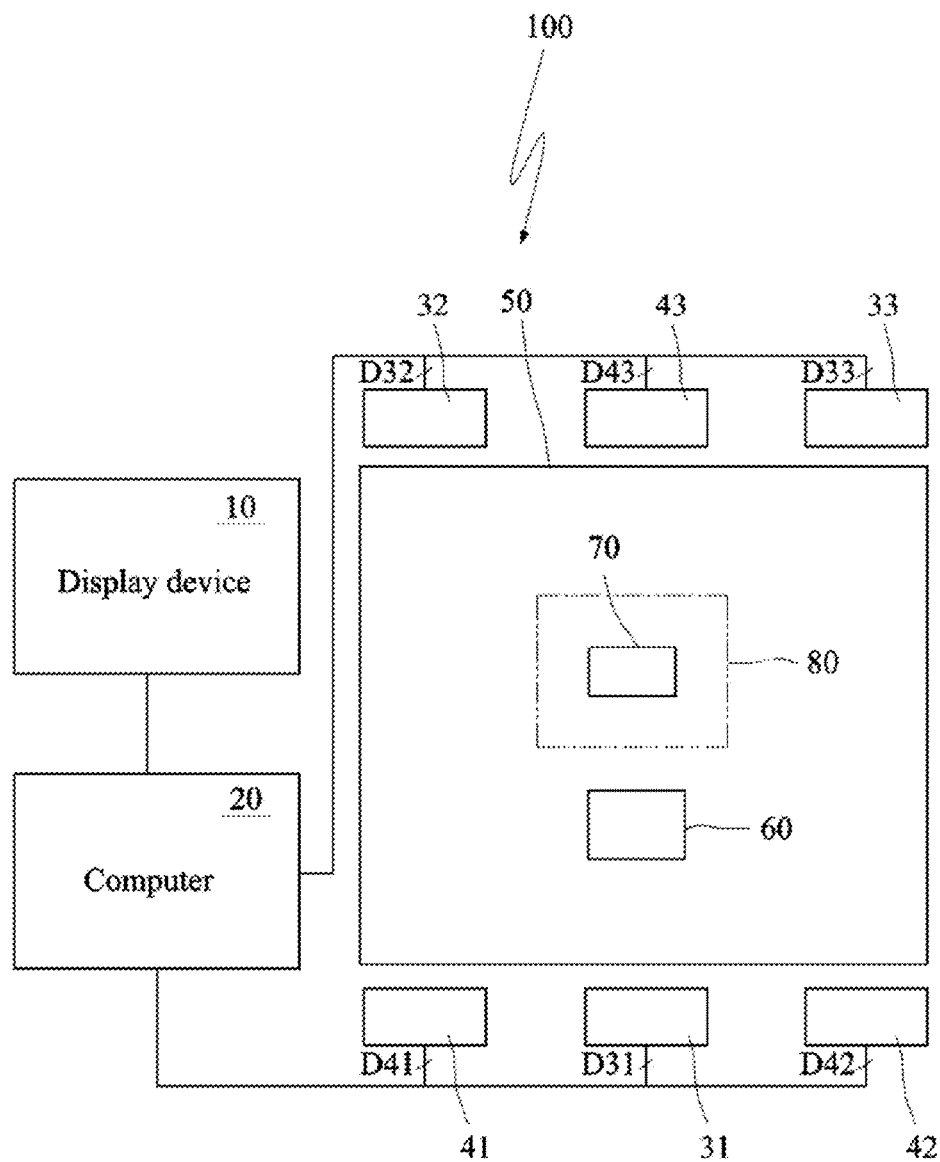
FIG. 1 is a schematic view showing a system using a method for optimizing occlusion according to a preferred embodiment of the invention.
Figure 2:
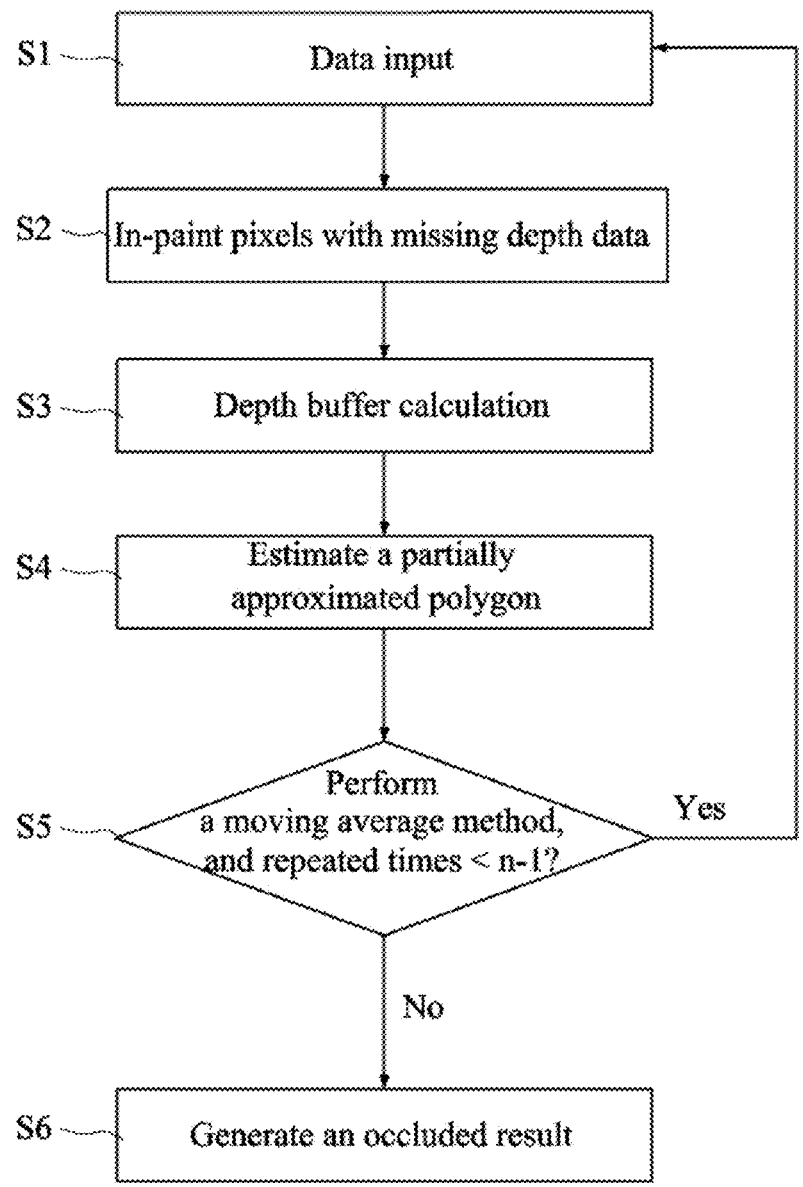
FIG. 2 is a flow chart showing the method for optimizing occlusion according to the preferred embodiment of the invention.

FIG. 1 is a schematic view showing a system using a method for optimizing occlusion according to a preferred embodiment of the invention. FIG. 2 is a flow chart showing the method for optimizing occlusion according to the preferred embodiment of the invention. Referring to FIGS. 1 and 2, the method for optimizing occlusion in augmented reality based on depth cameras according to the embodiment of the invention is applied to an augmented reality system 100. The augmented reality system 100 comprises one or multiple depth cameras (three depth cameras 41, 42 and 43 are depicted), and one or multiple color cameras (three color cameras 31, 32 and 33 are depicted). In addition, the augmented reality system 100 may further comprise a computer 20 and a display device 10. The computer 20 is connected to the display device 10, the depth cameras 41, 42 and 43 and the color cameras 31, 32 and 33 in a wired or wireless manner. In one example, the combination of the computer 20 and the display device 10 is a desktop computer, a workstation or a notebook computer. In another example, the combination of the computer 20 and the display device 10 is a mobile phone or a tablet computer. In still another example, the computer 20 and the display device 10 are two independent devices. For example, the computer 20 is the mobile phone or computer of one user, and the display device 10 is the mobile phone or computer of another user. The positions of the depth cameras and the color cameras may be fixed or moving with time. The method of the invention may also produce the similar result when the camera or cameras are moving with time.

In the example of FIG. 1, three depth cameras 41, 42 and 43 and three color cameras 31, 32 and 33 are described. The depth data becomes more complete through a proper calibration of the results captured by multiple depth cameras, thus enhancing the quality of the occlusion effect. Using multiple color cameras can switch the occlusion results at multiple viewing angles in conjunction with the depth cameras. In another example, however, the numbers and arrangements of the depth cameras and the color cameras may also be properly adjusted. Alternatively, the depth camera and the color camera may be combined into a single camera system.

The method for optimizing occlusion comprises Steps S1 to S6. It is worth noting that the Step S5 may be omitted according to the design consideration.

In Step S1, the one or multiple depth cameras 41, 42 and 43 capture a scene 50 and an object 60 in the scene 50 to obtain initial depth data D41, D42 and D43, and the one or multiple color (or two-dimensional) cameras 31, 32 and 33 capture the scene 50 and the object 60 to obtain the color (or two-dimensional) image data D31, D32 and D33. A mark element 70 may also be disposed in the scene 50, so that the computer 20 can perform the positioning and marking processes according to the patterns on the mark element 70. The pixels of the mark element 70 in the image may serve as a reference pixel of a virtual model 80. The reference pixel of the virtual model 80 may also be determined by different methods, or may be changed and adjusted by the user.

For description purpose, the depth camera 41 and the color camera 31 are illustrated as an example. The data captured by multiple depth cameras and multiple color cameras can be merged by image processing techniques.

Figure 3A:
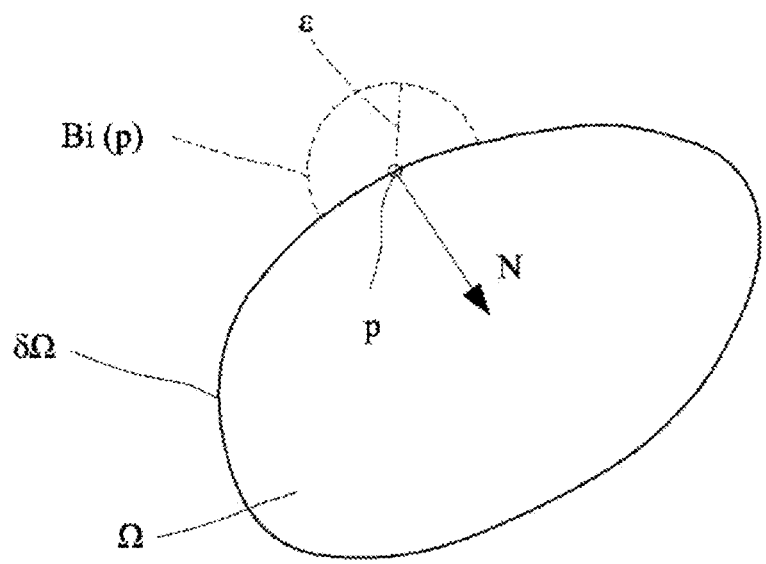
FIGS. 3A and 3B show an example of a model with depth data missing in some pixels or pixels without depth data in-painted.
Figure 3B:
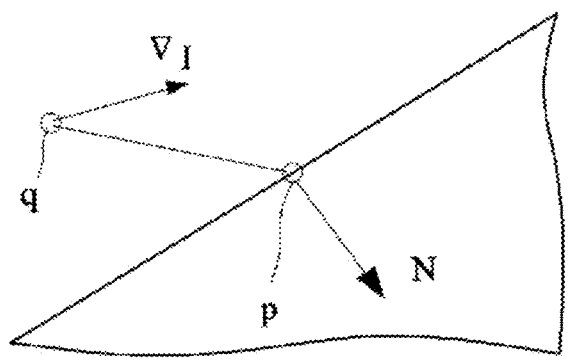

In Step S2, the initial depth data D41, D42 and D43 are in-painted to obtain in-painted depth data, wherein one example will be described in the following. FIGS. 3A and 3B show an example of a model, in which pixels with missing depth data are in-painted. As shown in FIGS. 3A and 3B, in order to solve the data missing problem, Step (a) is firstly performed to transform the initial depth data into the values ranging from 0 (e.g., fully white) to 255 (e.g., fully black), so that the initial depth data is converted into single channel grayscale image data; then Step (b) is performed to in-paint the single channel grayscale image data to fill the pixels without depth values in the single channel grayscale image data, and thus to obtain in-painted single channel grayscale image data; and then Step (c) is performed to convert the in-painted single channel grayscale image data into depth values to obtain the in-painted depth data.

In Step (b), for example, the fast marching method may be applied to produce a to-be-in-painted region $\Omega$ according to the single channel grayscale image data, wherein a contour of the to-be-in-painted region is set as $\delta\Omega$, and $\delta\Omega$ is sequentially in-painted inwardly one circle after another, wherein a to-be-in-painted pixel on $\delta\Omega$ is defined as p, and the in-painting value of the to-be-in-painted pixel is determined by Equation (1):

$$I(p) = \frac{\sum_{q \in B_i(p)} w(p, q)[I(q) + \nabla I(q)(p - q)]}{\sum_{q \in B_i(p)} w(p, q)}, \quad \text{Equation (1)}$$

where $B_i(p)$ is a group of neighboring pixels within a given radius $\epsilon$, q is one pixel in $B_i(p)$, I is the grayscale value of an input image, $\nabla I$ is the gradient value of I, and w is a weighting coefficient of the group of the neighboring non-in-paint pixels with respect to the pixel p;

wherein the weighting coefficient w is determined by the three factors of Equation (2), where dir represents that a pixel closer to a normal vector N has a greater influence; dst represents that the closer pixel has a greater influence; and lev represents that a non-in-paint pixel (in the region where in-painting is not needed) closer to a contour line has a greater influence, where T represents a distance from a representative pixel to $\delta\Omega$, and $d_0$ and $T_0$ are equal to 1, $$w(p, q) = dir(p, g) \cdot dst(p, q) \cdot lev(p, q) \quad \text{Equation (2)}$$
$$dir(p, g) = \frac{p - q}{\|p - q\|} \cdot N(p)$$
$$dst(p, q) = \frac{d_0^2}{\|p - q\|^2}$$
$$lev(p, q) = \frac{T_0}{1 + |T(p) - T(q)|}.$$

Figure 4A:
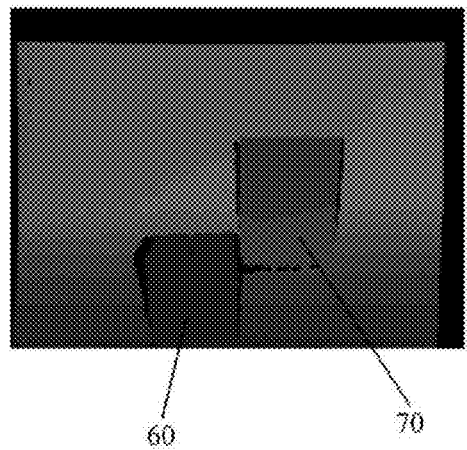
FIGS. 4A and 4B show the results before and after depth image in-painting, respectively.
Figure 4B:
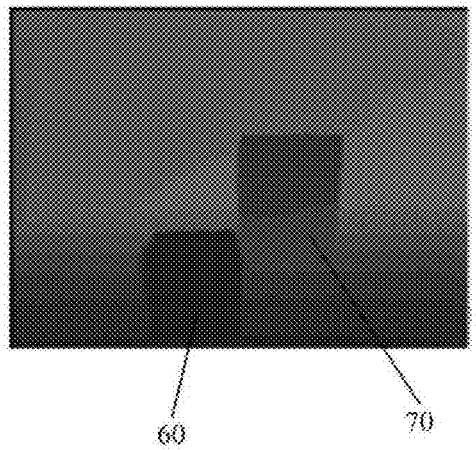

FIGS. 4A and 4B show the results before and after applying depth image in-painting, respectively. As shown in FIG. 4A, there are still some areas composed of black pixels, especially on the edges of the object 60 and the mark element 70 and the edge of the scene. The above-mentioned image in-painting method can modify those areas to obtain the result of FIG. 4B. The above-mentioned method is only one example of in-painting, and those skilled in the art should understand that other image in-painting methods may also be applied.

In Step S3, a depth buffer is calculated according to the in-painted depth data and the virtual model 80 to obtain the occlusion relationship between the object 60 and the virtual model. The current color camera (e.g., 31) generates an occluded partial image according to the color image data acquired and the virtual model. Because the virtual model is stored in the computer 20, its depth data has been known and can be easily compared with the depth data of the object 60 to obtain the occlusion relationship. This relationship specifies which portions of the object 60 are located in front of the virtual model, and which portions of the object 60 are located at back of the virtual model. Then, the color image of the scene 50 and the color image of the virtual model 80 are calculated to generate an occluded partial image.

Figure 5:
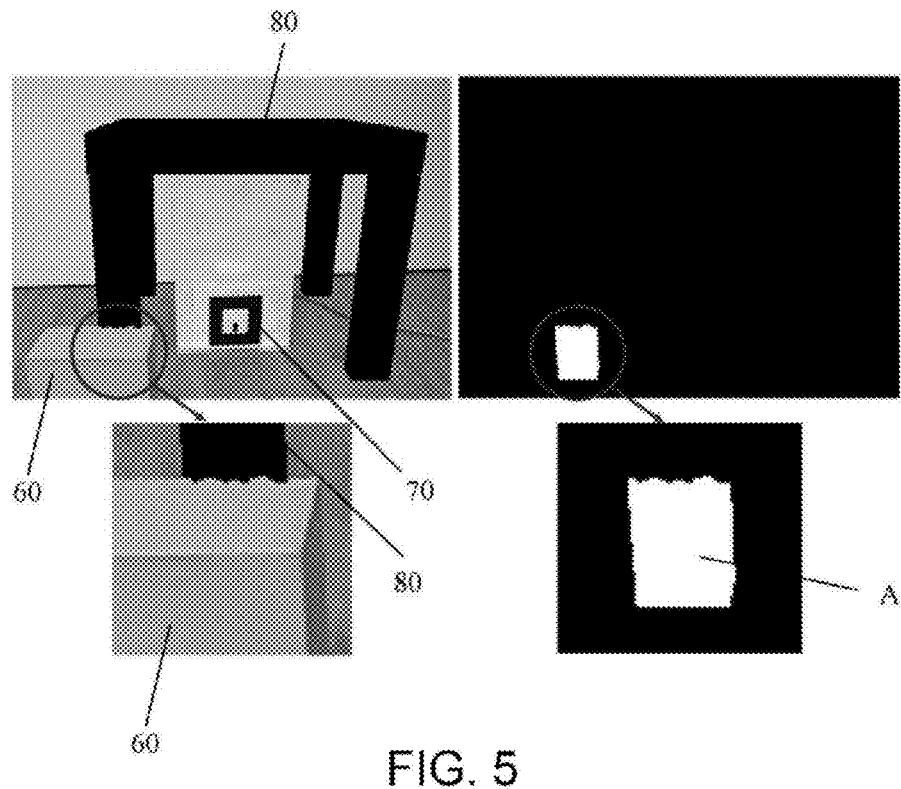
FIG. 5 is a schematic view showing the shape extracted from an occluded region.

FIG. 5 is a schematic view showing the extracted shape of an occluded region. The result of the occluded partial image A is shown in FIG. 5. Even though the depth data has been in-painted, it is still found that the occluded partial image A is of a poor quality with uneven edges. Thus, the occluded partial image A still needs to be further improved. The profile of the occluded partial image A is firstly determined. Then, a geometric algorithm is applied to obtain the complete contours of the object 60.

Step S4 is to solve the problem of the uneven edge, wherein an approximated polygon is estimated based on the occluded partial image A. The shape of the occluded partial image A is first extracted according to the current viewing angle. Then, the contour of the occluded partial image A is generated by edge detection. In the following, the Canny edge detection method serves as a non-restrictive example to be described.

First, the Gaussian filtering operation is performed on the input image, wherein a standard deviation σ, and the size k of the filter are given, a k*k discrete phalanx is established according to Equation (3), and a convolution operation is performed according to the discrete phalanx and image pixel values.

$$G(x, y) = \frac{1}{2\pi\sigma^2} e^{-1*\frac{x^2+y^2}{2\sigma^2}}.$$  Equation (3)

Then, the gradient and orientation in the image are determined, and the gradient and orientation of each pixel are determined through the filter defined by Equation (4).

$$G_x = \begin{bmatrix} -1 & 0 & 1 \\ -2 & 0 & 2 \\ -1 & 0 & 1 \end{bmatrix}, G_y = \begin{bmatrix} -1 & -2 & -1 \\ 0 & 0 & 0 \\ 1 & 2 & 1 \end{bmatrix}.$$  Equation (4)

Next, the maximum gradient of each pixel in the k*k rectangular frame is found along the gradient direction and reserved according to the non-maximum suppression rules. This step makes the detected edge clearer.

Then, two thresholds $T_{low}$ and $T_{high}$ are given. If the pixel's gradient value is lower than $T_{low}$, then the value is omitted; and if the pixel's gradient value is greater than $T_{high}$, then the value is considered to be on the edge, wherein the neighboring pixels of the gradient strength greater than $T_{low}$ are also considered to be on the edge. In this manner, the contour is gradually computed.

First, the contour of the occluded partial image is identified in the binary format (i.e., the edge is white, and the non-edge portion is black) according to the edge detection method. Then, the pixels of the contour of the occluded partial image are extracted from the binary image, and a contour or contours shorter than a predetermined length are removed, and only an outermost contour of the occluded partial image is reserved. Next, the partially approximated polygon is calculated from the reserved contour, wherein this step may be achieved by the way of curve fitting or straight line fitting, for example. In one example, a contour composed of multiple line segments is firstly given. Redundant pixels are removed if their distances to the fitted line are greater than a given maximum distance (D). The line segment of fewer pixels is also discarded. Thus, the partially approximated polygon can be obtained.

In another example, a convex hull is preferably selected because it can smoothen the contour of the occluded region and ensure that the original shape is completely covered. The steps of calculating the approximate shape in this example are as follows. The approximate polygon is calculated from the pixels of the contour. If the contour is convex, then the convex hull thereof is generated. If the contour is concave, then its approximate polygon is used to represent its shape. The approximate polygon may also be determined by the way of curve fitting or straight line fitting.

In Step S5, it is necessary to determine whether the moving average method needs to be performed or not. If not, then Step S6 is performed; otherwise, the process returns to Step S1. Applying the moving average method subjects to the user by the way of input commands, or by opening another dialogue window on the display device 10. The approximated polygon thus calculated becomes the shape of the region in the smoothened object occluded by the real scene. In order to solve the jittering problem of the occluded edge induced by the variation in continuous frames, a moving average method can be applied to the partially approximated polygon, wherein the current frame and the previous frames, n frames in total, are averaged, and a possibility (P) is given as a threshold value. In addition, the approximated polygon is determined when a non-in-paint possibilities of pixels in the n frames of the approximated polygons are greater than P, where n is a positive integer greater than 1. The non-in-paint possibility represents that the possibility where the value of the pixel, estimated by averaging multiple times, is greater than a predetermined value. For example, the values 255 and 255 of the first pixel at two frames are averaged to obtain 255; and the values 255 and 0 of the second pixel are averaged to obtain 127.5. In one case, it is assumed that the predetermined value is equal to 130, that the possibility is equal to 0.9 and that only two frames are considered. If the first/second pixel has the averaged value(s) greater than the predetermined value (130) with the possibility greater than 0.9, then the corresponding first/second pixel will be considered as a part of the approximated polygon. Since the first pixel has the averaged value (255) greater than the predetermined value (130), and only one averaged value of two frames is considered, the possibility is equal to 1 (>0.9). Since the second pixel has the averaged value (127.5) not greater than the predetermined value (130), and only one averaged value of two frames is considered, the possibility is equal to 0 (<0.9). That is, only the first pixel is considered as the part of the partially approximated polygon. Thus, the area of the partially approximated polygon increases with the increasing value of P. It is to be noted that the predetermined value may also be adjusted according to the requirement.

In another case, it is also assumed that the predetermined value is equal to 130, that the possibility is equal to 0.9 and that only two frames are considered, but the values of the first pixel at two frames are not averaged. For example, the values of the first pixel at two frames are 255 and 255; and the values the second pixel at the two frames are 255 and 0. If the first/second pixel has the values greater than the predetermined value (130) with the possibility greater than 0.9, then the corresponding first/second pixel will be considered as a part of the approximated polygon. Since the first pixel has the values (255 and 255) greater than the predetermined value (130), and only two values of two frames are considered, the possibility is equal to 1 (>0.9). Since the second pixel has the value (255) greater than the predetermined value (130) and the value (0) not greater than the predetermined value (130), and only two values of two frames are considered, the possibility is equal to 0.5 (<0.9). That is, only the first pixel is considered as the part of the partially approximated polygon.

Thus, in Step S5, if the moving average method needs to be performed, then Steps S1 to S4 are repeated by (n−1) times so that n approximated polygons are obtained. Then, these n polygons are averaged to obtain the partially approximated polygon.

If the moving average method does not need to be applied or the repeating times have reached the predetermined value, then the occluded result is directly generated in Step S6 according to the approximated polygon, the color image data and the virtual model. The occluded region is not the result obtained by pure image superimposing.

Figures 6A, 6B:
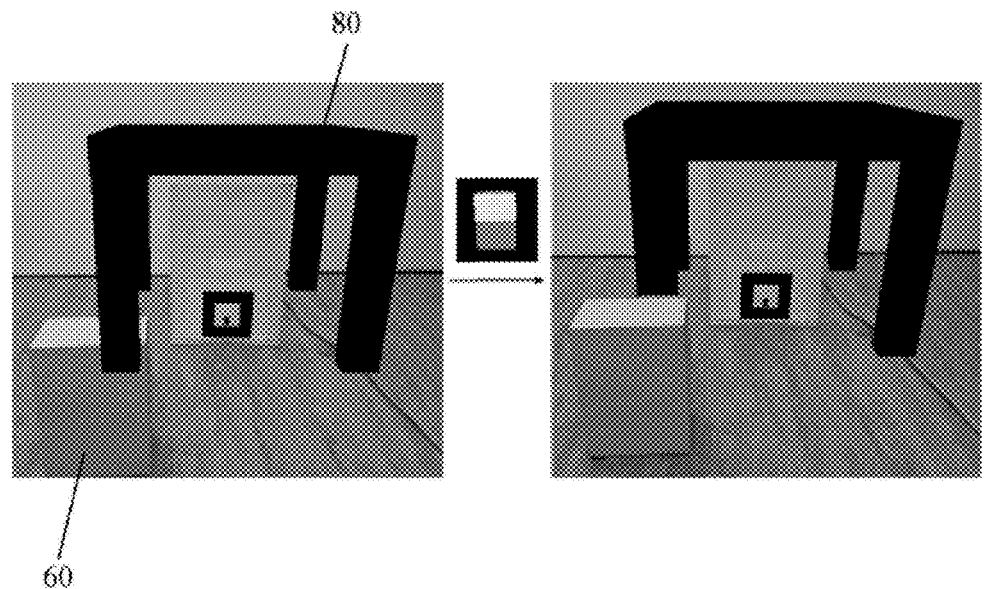
FIGS. 6A and 6B show the results before and after applying the method.

FIGS. 6A and 6B show an example of results before and after the method for optimizing occlusion is performed. It is worth noting that in Step S3, an unoccluded image (FIG. 6A) is further generated according to the two-dimensional image data and the virtual model, wherein the unoccluded image is a two-dimensional image obtained when the virtual model is superimposed on the object. In this example, the two-dimensional image of the virtual model 80 directly covers the two-dimensional image of the scene. In the Step S6, the corresponding portion of the two-dimensional image data is used to fill the partially approximated polygon, and the partially-approximated-polygon filled image is superimposed on the unoccluded image to obtain the occluded result, as shown in FIG. 6B.

Superimposing the partially-approximated-polygon filled image on the unoccluded image can be performed by way of fading animation, flickering or repeated animation of fading in and out, so that the user knows which portions of the virtual object are occluded.

In addition to the above-mentioned method, it is also possible to crop an image of the virtual model according to the corresponding portion of the two-dimensional image data, and superimpose an cropped-out image of the virtual model on the two-dimensional image data to obtain the occluded result in another example. That is, the portion of the two-dimensional image of the virtual model 80 of FIG. 6A overlapping with the object 60 is firstly cropped, and then a two-dimensional image of another virtual model is generated, and the two-dimensional image of this virtual model is superimposed on the two-dimensional image data of the scene. In this manner, the above-mentioned occluded result may also be obtained.

Figures 7A, 7B, 7C:
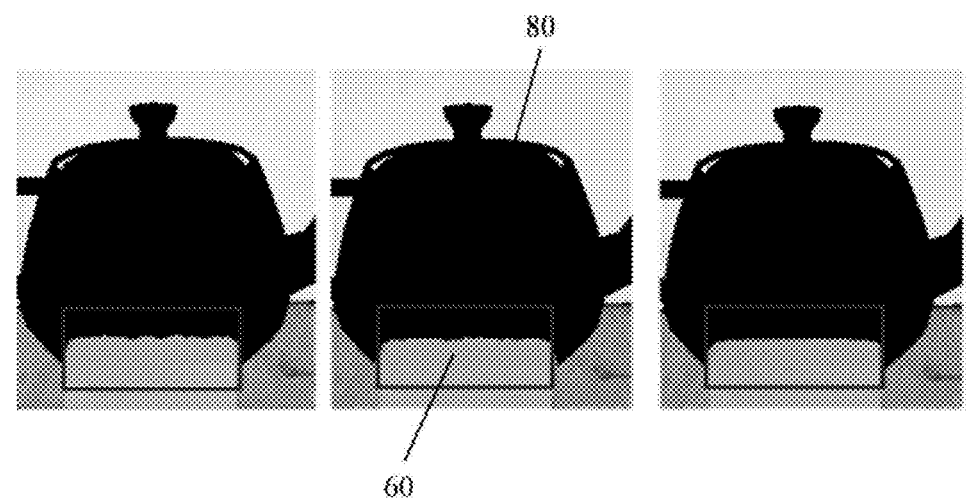
FIGS. 7A to 7C show the results of approximate polygons corresponding to different parameters D.

FIGS. 7A to 7C show results of approximate polygons corresponding to different parameters D. Adjusting the value of the direct maximum distance (D) can change the smoothness of the approximate polygon, wherein more vertices are discarded and the number of sides in the polygon decreases when the value of D gets greater. On the contrary, fewer vertices are discarded and the number of sides in the polygon increases when the value of D gets smaller. As shown in FIGS. 7A to 7C, the values of D are 0.5, 2.5, 4.5 pixel widths, respectively, and it is found that the line segments of the occluded edge get smoother and smoother with the increasing value of D.

Figures 8A, 8B:
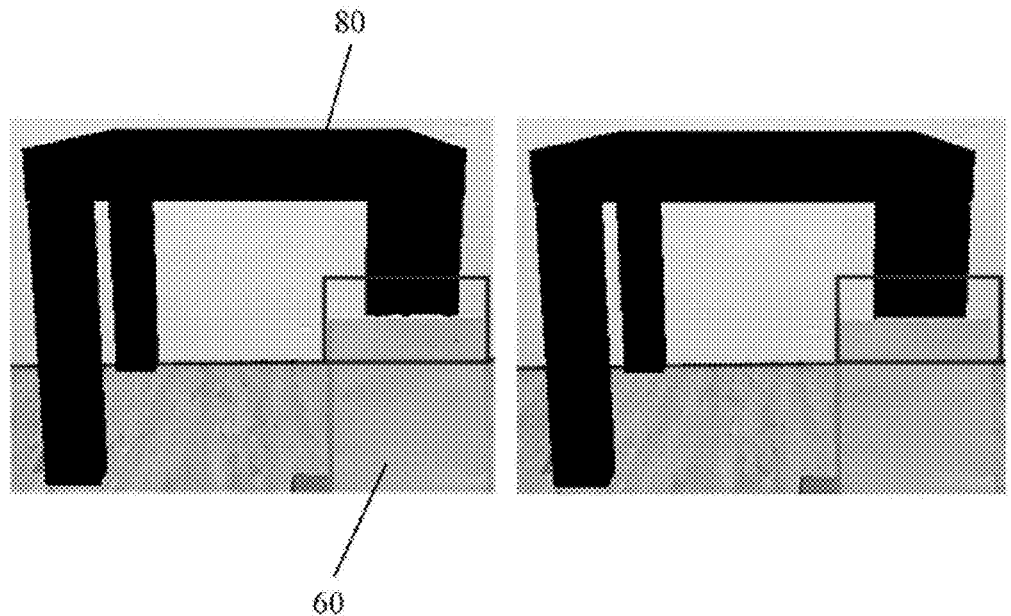
FIGS. 8A and 8B show another example before and after applying the method.
Figures 9A, 9B:
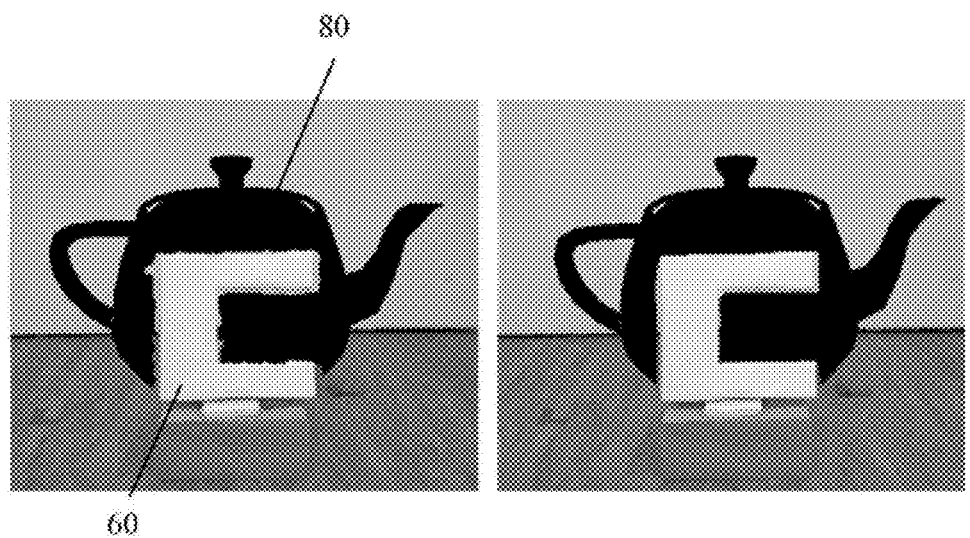
FIGS. 9A and 9B show another example before and after applying the method.

FIGS. 8A and 8B show another example of results before and after the method for optimizing occlusion is performed. FIGS. 9A and 9B show another example of results before and after the method for optimizing occlusion is performed. The occlusion objects in FIGS. 8A and 8B are convex objects, while the occlusion objects of FIGS. 9A and 9B are concave objects. Using the method for optimizing occlusion according to the invention can produce satisfactory occluding effect.

Figures 10A, 10B:
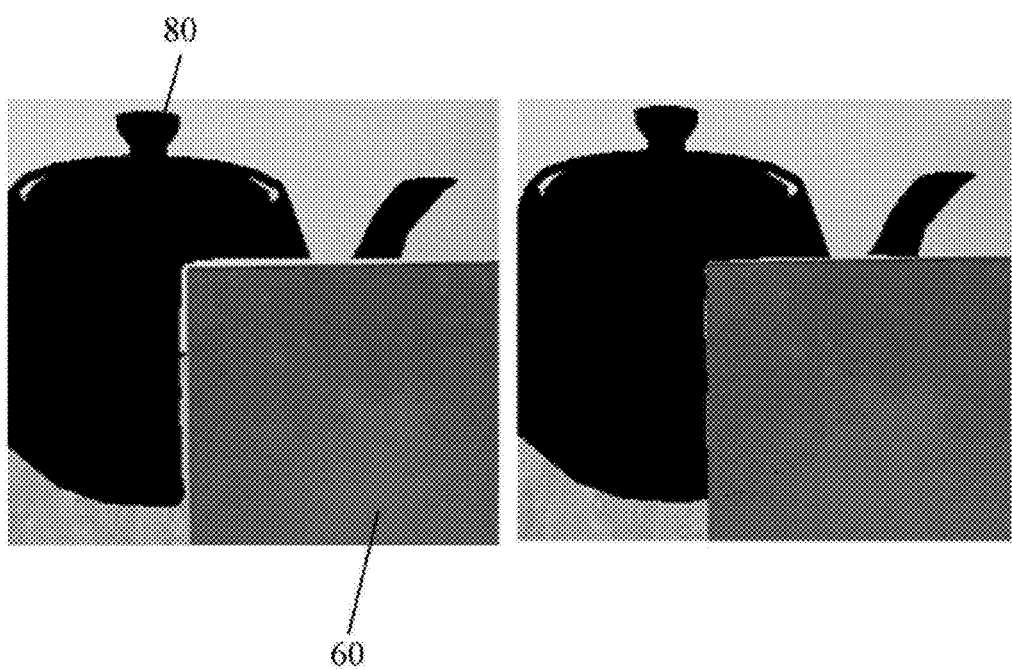
FIGS. 10A and 10B show the occluding effects corresponding to different values of P.

FIGS. 10A and 10B show occluding effects corresponding to different values of P. As shown in FIGS. 10A and 10B, the result may have a poor matching between the occluded edge and the object. To solve this problem, the value of P can be adjusted to enhance the matching between the occluded edge and the color image. Different values of P may correspond to different effects. With a greater value of P, there are more pixels exceeding the threshold value, and the occlusion range (partially approximated polygon) gets larger. On the contrary, with a smaller value of P, there are fewer pixels exceeding the threshold value, and the occlusion range gets smaller. The values of P in FIGS. 10A and 10B are equal to 0.9 and 0.1, respectively. It is observed that FIG. 10A has the larger occlusion region, so that the occlusion range is greater than the object boundary, and the scene in the back of the object becomes visible (see the left edge and the top edge of the object 60).

The embodiment of the invention can optimize the occluded result calculated from the virtual model and the depth data captured by depth cameras in a virtual reality application. The method can effectively solve the problems suffering by the current depth camera such as missing depth data pixels, unsmooth occlusion edge/silhouette, and random variations in continuous frames, and can provide adjustable parameters in response to different requirements.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A method for optimizing occlusion occurring in an augmented reality system comprising one or multiple depth cameras and one or multiple two-dimensional cameras, the method comprising the steps of:
    (a) capturing, by the one or multiple depth cameras, a scene and an object in the scene to obtain initial depth data, and capturing, by the one or multiple two-dimensional cameras, the scene and the object to obtain two-dimensional image data;
    (b) in-painting the initial depth data to obtain in-painted depth data;
    (c) performing a depth buffer calculation according to the in-painted depth data and a virtual model to obtain an occlusion relationship between the object and the virtual model, and generating an occluded partial image according to the two-dimensional image data and the virtual model;
    (d) estimating a partially approximated polygon according to the occluded partial image; and
    (e) generating an occluded result according to the partially approximated polygon, the two-dimensional image data and the virtual model, wherein the step (b) comprises:
    (b1) transforming the initial depth data into single channel grayscale image data;
    (b2) in-painting the single channel grayscale image data to fill depth values into data pixels without depth values in the single channel grayscale image data, and thus obtaining in-painted single channel grayscale image data; and (b3) converting the in-painted single channel grayscale image data into depth values to obtain the in-painted depth data.

2. The method according to claim 1, wherein in the step (b2):

a to-be-in-painted region $\Omega$ is set, a contour of the to-be-in-painted region is set as $\delta\Omega$, and $\delta\Omega$ is sequentially in-painted inwardly one circle after another, wherein a to-be-in-painted pixel on $\delta\Omega$ is defined as p, and an in-painting value of the to-be-in-painted pixel is determined by Equation (1):

$$I(p) = \frac{\sum_{q \in B_i(p)} w(p, q)[I(q) + \nabla I(q)(p - q)]}{\sum_{q \in B_i(p)} w(p, q)}, \quad \text{Equation (1)}$$

where $B_i(p)$ is a neighboring pixel group within a given radius $\epsilon$, q is one of the pixels in $B_i(p)$, I is a grayscale value of an input image, $\nabla I$ is a gradient value of I, and w is a weighting coefficient of a neighboring non-in-paint pixel group with respect to the pixel p;

wherein the weighting coefficient w is determined by three factors of Equation (2), wherein dir represents that a pixel closer to a normal vector has greater influence; dst represents that the closer pixel has greater influence; and lev represents that a non-in-paint pixel closer to a contour line has greater influence, wherein T represents a distance from a representative pixel to $\delta\Omega$, and $d_0$ and $T_0$ are equal to 1, $$w(p, q) = dir(p, g) \cdot dst(p, q) \cdot lev(p, q) \quad \text{Equation (2)}$$
$$dir(p, g) = \frac{p - q}{\|p - q\|} \cdot N(p)$$
$$dst(p, q) = \frac{d_0^2}{\|p - q\|^2}$$
$$lev(p, q) = \frac{T_0}{1 + |T(p) - T(q)|}.$$

3. The method according to claim 1, wherein the step (d) comprises:
(d1) finding a contour of the occluded partial image to obtain a binary image according to an edge detection method;
(d2) extracting pixels of the contour of the occluded partial image according to the binary image and removing a too-short contour or too-short contours shorter than a predetermined length, and only reserving an outermost contour of the occluded partial image to obtain a reserved contour; and
(d3) calculating the partially approximated polygon according to the reserved contour.

4. The method according to claim 3, wherein the step (d3) is achieved by: giving a line composed of multiple line segments, removing unnecessary pixels according to a given direct maximum distance, finding a line segment having fewer pixels and a shape approximating to the preserved contour, and simplifying the line segment as a subset of pixels of an original line segment.

5. The method according to claim 1, wherein in the step (e), an image of the virtual model is cropped out according to a corresponding portion of the two-dimensional image data, and a cropped-out image of the virtual model is superimposed on the two-dimensional image data to obtain the occluded result.

6. A method for optimizing occlusion occurring in an augmented reality system comprising one or multiple depth cameras and one or multiple two-dimensional cameras, the method comprising the steps of:
(a) capturing, by the one or multiple depth cameras, a scene and an object in the scene to obtain initial depth data, and capturing, by the one or multiple two-dimensional cameras, the scene and the object to obtain two-dimensional image data;
(b) in-painting the initial depth data to obtain in-painted depth data;
(c) performing a depth buffer calculation according to the in-painted depth data and a virtual model to obtain an occlusion relationship between the object and the virtual model, and generating an occluded partial image according to the two-dimensional image data and the virtual model;
(d) estimating a partially approximated polygon according to the occluded partial image;
(e) generating an occluded result according to the partially approximated polygon, the two-dimensional image data and the virtual model; and
(f) repeating, before the step (e), the steps (a) to (d) by (n-1) times to obtain n partially approximated polygons, and averaging the n partially approximated polygons to obtain the partially approximated polygon, where n is a positive integer greater than 1.

7. The method according to claim 6, wherein in the step (f), a possibility (P) is further given as a threshold value, and the partially approximated polygon is determined when non-in-paint possibilities of pixels in frames of the n partially approximated polygons are greater than P.

8. A method for optimizing occlusion occurring in an augmented reality system comprising one or multiple depth cameras and one or multiple two-dimensional cameras, the method comprising the steps of:
(a) capturing, by the one or multiple depth cameras, a scene and an object in the scene to obtain initial depth data, and capturing, by the one or multiple two-dimensional cameras, the scene and the object to obtain two-dimensional image data;
(b) in-painting the initial depth data to obtain in-painted depth data;
(c) performing a depth buffer calculation according to the in-painted depth data and a virtual model to obtain an occlusion relationship between the object and the virtual model, and generating an occluded partial image according to the two-dimensional image data and the virtual model;
(d) estimating a partially approximated polygon according to the occluded partial image; and
(e) generating an occluded result according to the partially approximated polygon, the two-dimensional image data and the virtual model, wherein in the step (c), an unoccluded image is further generated according to the two-dimensional image data and the virtual model, wherein the unoccluded image is a two-dimensional image obtained when the virtual model is superimposed on the object, wherein in the step (e), a corresponding portion of the two-dimensional image data fills the partially approximated polygon to obtain a partially-approximated-polygon filled image, which is superimposed on the unoccluded image to obtain the occluded result.

9. The method according to claim 8, wherein the partially-approximated-polygon filled image is superimposed on the unoccluded image by way of fading animation.

* * * * *